United States Patent [19]

Sakoguchi et al.

[11] Patent Number: 5,781,683
[45] Date of Patent: Jul. 14, 1998

[54] VIDEO REPRODUCING APPARATUS WITH NON-REPETITIVE SELECTING FUNCTION

[75] Inventors: Iwao Sakoguchi; Yasuhiro Funahashi; Yoshiko Sakoguchi, all of Nagoya, Japan

[73] Assignee: Brother Kogyo Kabushiki Kaisha, Nagoya, Japan

[21] Appl. No.: 228,717

[22] Filed: Apr. 18, 1994

[30] Foreign Application Priority Data

May 14, 1993 [JP] Japan .................................. 5-113219
Jan. 25, 1994 [JP] Japan .................................. 6-006475

[51] Int. Cl.$^6$ ........................................... H04N 17/18
[52] U.S. Cl. ................... 386/96; 386/97; 386/106; 386/68; 386/77
[58] Field of Search ............................. 358/335, 906; 348/343, 341, 335; 84/645, 610; 386/96, 97, 106, 68, 77

[56] References Cited

U.S. PATENT DOCUMENTS

| 5,131,311 | 7/1992 | Murakami et al. | 358/335 |
|---|---|---|---|
| 5,157,643 | 10/1992 | Suzuki | 369/33 |
| 5,208,679 | 5/1993 | Yamauchi | 358/343 |
| 5,233,438 | 8/1993 | Funahashi | 358/335 |
| 5,245,600 | 9/1993 | Yamauchi et al. | 358/343 |
| 5,250,747 | 10/1993 | Tsumura | 84/645 |
| 5,252,775 | 10/1993 | Urano | 358/335 |
| 5,319,452 | 6/1994 | Funahashi | 358/341 |
| 5,321,200 | 6/1994 | Yamamoto | 84/645 |
| 5,454,723 | 10/1995 | Horii | 434/307 |
| 5,486,645 | 1/1996 | Suh et al. | 84/610 |
| 5,499,221 | 3/1996 | Ito et al. | 369/32 |
| 5,506,690 | 4/1996 | Kim | 358/342 |
| 5,510,573 | 4/1996 | Cho et al. | 84/610 |
| 5,548,281 | 8/1996 | Funahashi et al. | 340/825.08 |

FOREIGN PATENT DOCUMENTS

4348570 12/1992 Japan .................................. G09B 5/00

*Primary Examiner*—Tommy P. Chin
*Assistant Examiner*—Anand S. Rao
*Attorney, Agent, or Firm*—Oliff & Berridge, PLC

[57] ABSTRACT

A video reproducing apparatus includes a video data memory for storing video data and a video data table for storing information about whether or not given items of the video data in the video data memory have been reproduced. A backup power supply unit backs up the information in the video data table when power is removed. A song category designation input unit is provided for inputting the song category designated, a video reproducing unit is provided for reproducing video data, and a background video control unit is provided for controlling the component units configured. On the basis of the information held in the video data table, the background video control unit determines whether or not any unreproduced video data remains in the video data belonging to the song category designated by the song category designation input unit. If unreproduced video data is found to exist, the control unit instructs the video reproducing unit to reproduce that unreproduced video data.

23 Claims, 6 Drawing Sheets

| S501: | REPRODUCTION DESIGNATION CHANGEOVER SWITCH ON ? |
|---|---|
| S502: | SONG CATEGORY DESIGNATING DATA INPUT ? |
| S503: | REFER TO VIDEO DATA TABLE FOR STATUS OF SONG CATEGORY INDICATED BY SONG CATEGORY VARIABLE |
| S504: | UNREPRODUCED VIDEO DATA EXIST ? |
| S505: | INITIALIZE STATUS OF DESIGNATED SONG CATEGORY BLOCK IN VIDEO DATA TABLE |
| S506: | SELECT UNREPRODUCED VIDEO DATA RANDOMLY |
| S507: | SET VIDEO DATA TO BE REPRODUCED IN VIDEO DATA TABLE |
| S508: | ORDER REPRODUCTION OF SELECTED VIDEO DATA |
| S509: | SET DESIGNATED SONG CATEGORY IN SONG CATEGORY VARIABLE |
| S510: | CURRENTLY REPRODUCING VIDEO DATA CLOSE TO ITS END ? |

FIG. 6B

| S600: | SET 1 IN COUNTER OF EACH SONG CATEGORY |
|---|---|
| S601: | SONG CATEGORY DESIGNATING DATA INPUT ? |
| S602: | CURRENTLY REPRODUCING VIDEO DATA CLOSE TO ITS END ? |
| S603: | SET DESIGNATED SONG CATEGORY IN SONG CATEGORY VARIABLE MEMORY |
| S604: | INCREMENT BY 1 SONG CATEGORY COUNTER POINTED TO BY SONG CATEGORY VARIABLE |
| S605: | HIGHEST POSSIBLE COUNT EXCEEDED ? |
| S606: | RESET TO 1 COUNTER POINTED TO BY SONG CATEGORY VARIABLE |
| S607: | ORDER REPRODUCTION OF SELECTED VIDEO DATA |
| S608: | REPRODUCTION DESIGNATION CHANGEOVER SWITCH ON ? |

VIDEO REPRODUCING APPARATUS WITH NON-REPETITIVE SELECTING FUNCTION

BACKGROUND OF THE INVENTION

1. Field of the Invention

The present invention relates to a video reproducing apparatus for reading video data from a video data storage medium on which a plurality of video data are stored, the read-out video data being reproduced when output.

2. Description of Related Art

Commonly known karaoke apparatuses that reproduce background music sound tracks for do-it-yourself vocals can be equipped to play back recorded background music while reproducing corresponding video data. Most of the apparatuses of this kind are operated by superimposing song text (lyrics) on the background video. The storage medium for storing background video data thereon is illustratively a video disc that is played back for a total of one to two hours. The trend today is toward prolonging the total playback time of the storage medium so that customers will better enjoy singing songs accompanied by the increased amount of stored video data.

Some apparatuses are designed to more or less match the reproduced video data with the superimposed song text. For that purpose, the video data is divided into groups that go with different categories of songs: for example, enka music (ballads combining lyrics and melodies that express typical Japanese feelings with Western music) or pop music.

Whether the background video data is grouped or not by song category, generally the apparatus retrieves the video data of a single group (if the video data is not grouped by song category) or of a plurality of groups (where the video data is grouped by song category) in the order in which the video data of each group is stored on the storage medium. The purpose of this scheme is to average the frequencies at which the stored video data is retrieved and output.

Under the above scheme, however, every time the video reproducing apparatus (more specifically, the video disc drive) is turned on, video data retrieval always starts from the beginning. Thus, the video reproduction always commences with the same image.

Even when the video data is grouped by song category, the first image to be reproduced for a given category is always the same. Where the total playback time of the reproducing apparatus is relatively short, the same cycle of a series of video data is output repeatedly from beginning to end during a day's use. Thus, it matters little from which image the retrieval of stored video data starts. On the other hand, suppose that the total playback time is longer than the entire day's business hours and that the apparatus is turned on at the start of the business hours and turned off at the end of each day's work. In that case, the images located toward the end of the sequential order of storage are seldom, if ever, retrieved and output. This has been a considerable impediment to averaging the reproducing frequencies of the stored video data.

With the above conventional scheme in place, customers of karaoke entertainment are more likely to sing songs with the same background video, with a sizable amount of video data left unused. This is a waste of data resources that deprives the customers of the entertainment they could otherwise enjoy.

SUMMARY OF THE INVENTION

It is therefore an object of the present invention to overcome the above and other deficiencies and disadvantages of the prior art and to provide a video reproducing apparatus that prevents a limited number of images from being reproduced more frequently than other images. Further, it is an object of this invention to provide a video reproducing apparatus that allows the stored image data to be reproduced randomly and not sequentially for a given song category so that customers will not become bored with repetitive video reproduction.

To achieve the foregoing and other objects of the present invention, according to one aspect thereof, the video reproducing apparatus comprises: input means for inputting information for selecting a given group of video data from a video data storage medium and storage means for storing at least one of two sets of video data, one set having been reproduced and the other set currently being reproduced, in the group of video data selected according to the selection information input through the input means. Determining means determines whether all video data in the selected group of video data has been reproduced on the basis of the contents of the storage means and selecting means selects the unreproduced video data if the determining means finds any video data not yet reproduced. A reproduction designating means designates the reproduction of the video data selected by the selecting means.

In a preferred structure according to the invention, the selecting means may be arranged to select the unreproduced video data in one of two manners, randomly and in a desired sequence.

In another preferred structure according to the invention, the selecting means may be arranged to enter one of two states, one state for randomly selecting the unreproduced video data and the other state for selecting the video data in a desired sequence. The selecting means further includes switching means for switching from one state to the other.

In a further preferred structure according to the invention, the video reproducing apparatus may further comprise second storage means for storing the reproducing sequence selected by the selecting means. Then, the selecting means selects the video data in the sequence stored in the second storing means when the determining means determines that all video data in the currently selected group has been reproduced.

In any of the preferred structures above, the storage means may include data retaining means for retaining the data held in the storage means whenever the video reproducing apparatus is turned off.

These and other objects, features and advantages of the invention will become more apparent upon a reading of the following description and appended drawings.

DESCRIPTION OF PREFERRED EMBODIMENTS

Figure 1:
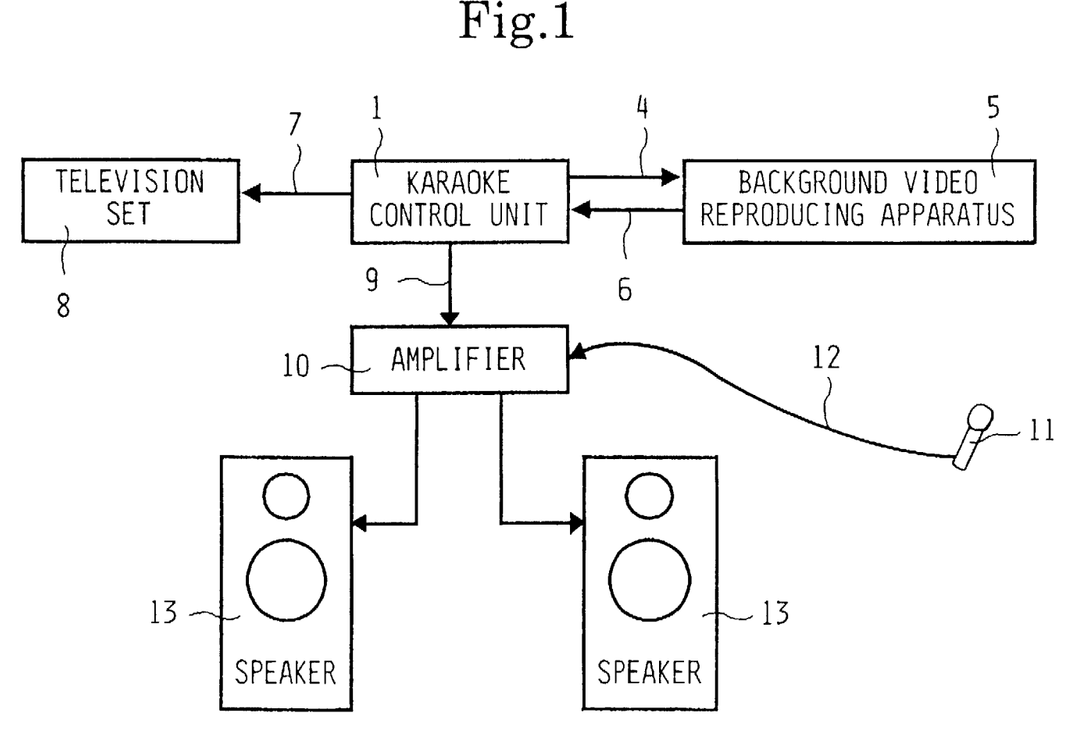
FIG. 1 is a block diagram of a typical karaoke system to which the invention is applied.
Figure 2:
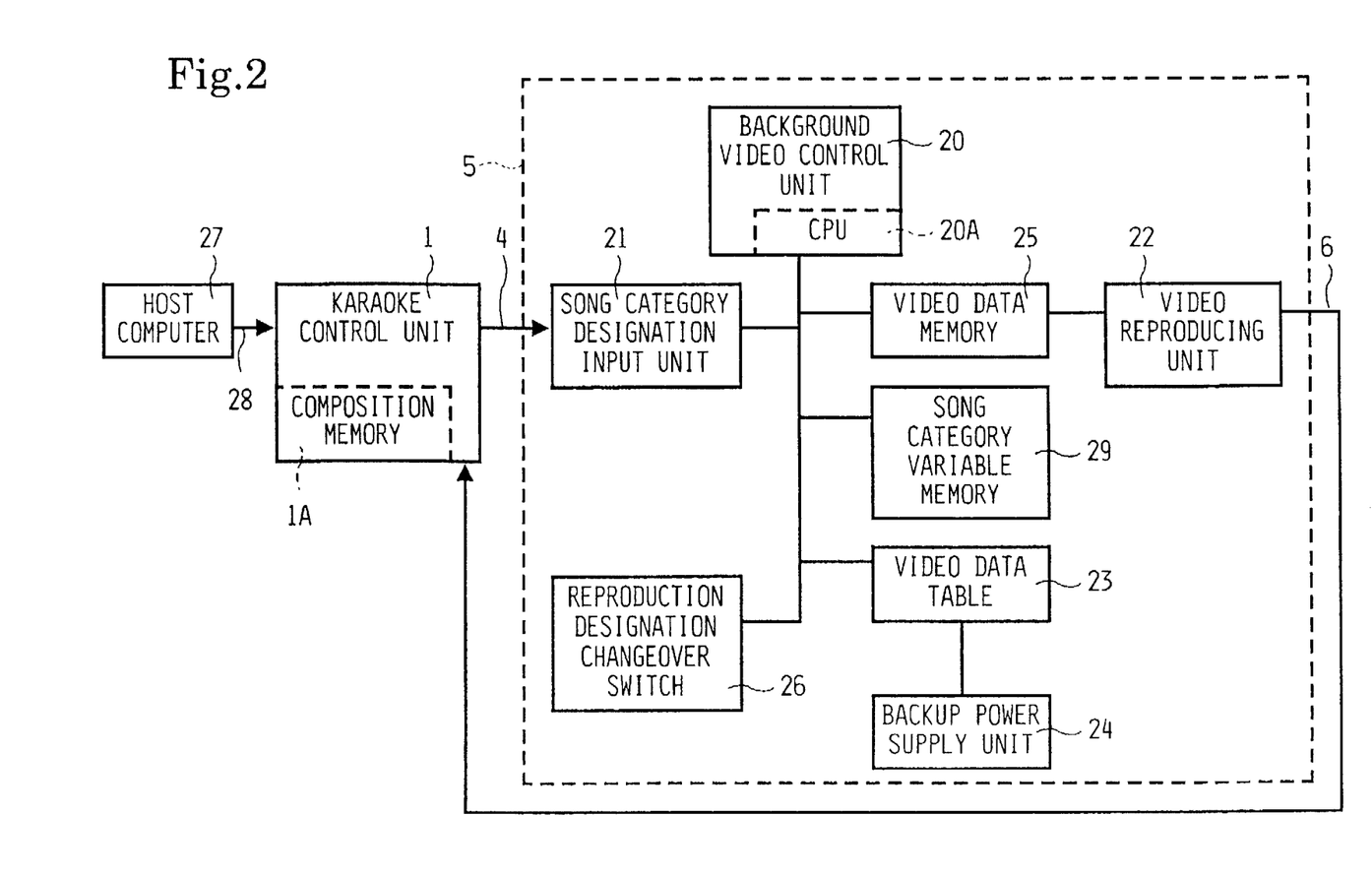
FIG. 2 is a block diagram of a background video reproducing apparatus in the system.

A video reproducing apparatus according to a preferred embodiment of the invention and incorporated into a karaoke system for illustrative purposes is outlined referring to FIGS. 1 and 2.

The karaoke system to which the invention is applied comprises a karaoke control unit 1, a background video reproducing apparatus 5, a television set 8, an amplifier 10, a microphone 11 and speakers 13. The karaoke control unit 1 has a composition memory 1A that stores a plurality of karaoke data coded as per the MIDI (musical instrument digital interface) standards. In operation, the control unit 1 starts orchestral background music for a singer's accompaniment in accordance with the song designated by the singer. The karaoke control unit 1 obtains new-song data 28 by communicating over communication channels with a host computer 27 having a song data-base including the data on newly accommodated songs. When starting the accompaniment of a song, the karaoke control unit 1 outputs song category designating data 4 instructing the background video reproducing apparatus 5 to reproduce the video data relevant to the song. In addition, the karaoke control unit 1 superimposes on a video signal 6, described later, a song text signal generated internally and supplies the television set 8 with a karaoke video signal 7 comprising the song text. The karaoke control unit 1 also outputs an accompaniment signal 9 to the amplifier 10. This assembly is equivalent to that disclosed in U.S. Pat. Nos. 5,233,438, 5,252,775 and 5,131,311, the disclosures of which are expressly incorporated herein by reference.

The background video reproducing apparatus 5 receives the song category designating data 4 from the karaoke control unit 1. In turn, the background video reproducing apparatus 5 sends the video signal 6 of the song category corresponding to the song category designating data 4 to the karaoke control unit 1.

The amplifier 10 receives the accompaniment signal 9 from the karaoke control unit 1 and a vocal signal 12 entered from the microphone 11. The two signals are mixed by the amplifier 10 before being output to the speakers 13.

The background video reproducing apparatus 5, the key component of this invention, is described in detail with reference to FIGS. 2 through 4.

The background video reproducing apparatus 5 comprises a background video control unit 20, a song category designation input unit 21, a video reproducing unit 22, a video data table 23, a backup power supply unit 24, a video data memory 25, a reproduction designation changeover switch 26 and a song category variable memory 29.

The background video control unit 20 controls the video reproducing apparatus 5 as a whole using a CPU 20A. The song category designation input unit 21 admits the song category designation data 4 coming from the karaoke control unit 1.

Figure 3:
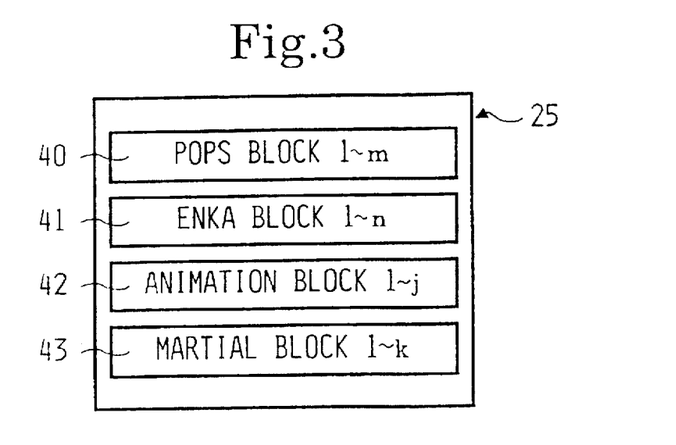
FIG. 3 is a block diagram of a video data memory in the karaoke system.

The video data memory 25, as shown in FIG. 3, is a video data storage medium that has a plurality of blocks of video data grouped by song category and stored on video discs. Under control of the background video control unit 20, the video data memory 25 outputs video data to the video reproducing unit 22. In the memory structure of FIG. 3, there are four video blocks grouped by song category. That is, a pops block 40 comprises m video data (1 to m); an enka block 41 comprises n video data (1 to n); an animation song block 42 comprises j video data (1 to j); and a martial song block 43 comprises k video data (1 to k).

The video reproducing unit 22 converts the video data coming from the video data memory 25 into a video signal 6. The video playback time of each video block is preferably around five minutes so as to comply with the playing time of a single song.

Figure 4:
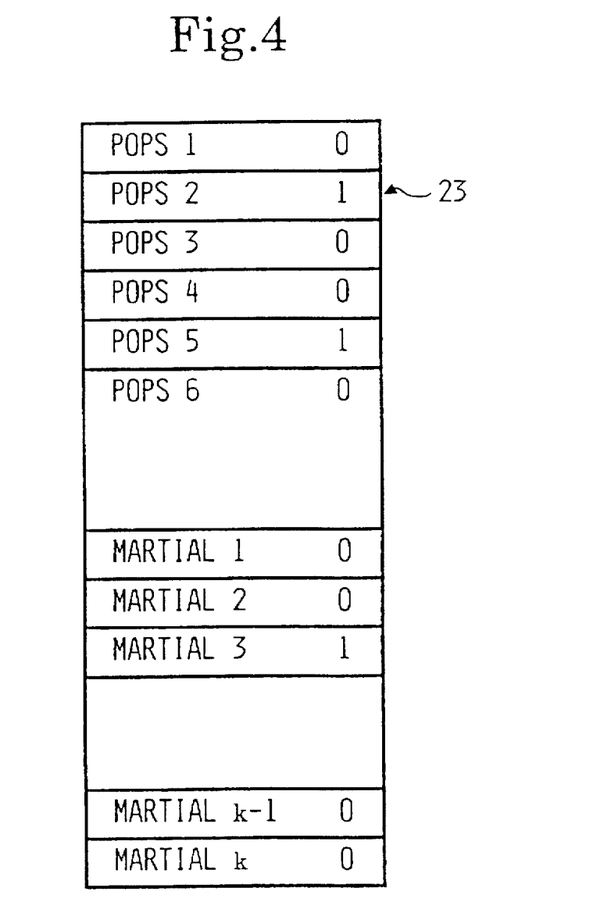
FIG. 4 is a memory structure of a video data table provided as part of the system.

The video data table 23 serves as storage means and is a writable memory structured as shown in FIG. 4. The starting address of the video data table 23 accommodates information as to whether or not video data 1 of the pops block has been reproduced; the end address of the video data table 23 contains information as to whether or not video data k of the martial song block has been reproduced. If video data is already reproduced, "1" is written to the corresponding address location; if the video data has yet to be reproduced, "0" is set to the corresponding address location. In the example of FIG. 4, pops data 2 and 5 as well as martial song data 3 have been reproduced. The video data table 23 is backed up by the backup power supply unit 24 that works as data retaining means for retaining the stored data while power is removed.

The reproduction designation changeover switch 26 acting as switching means is used to select one of two options: to reproduce video data randomly within the song category block designated with reference to the video data table 23 or to reproduce video data sequentially from video data 1 onward within a given song category stored in the video data memory 25. Turning on the reproduction designation changeover switch 26 selects the first option, and turning it off selects the second option.

The song category variable memory 29 stores a song category variable corresponding to the song category designating data 4 output from the karaoke control unit 1 to the song category designation input unit 21.

The foregoing description has centered on the composition of the apparatus embodying the invention. Below is a description of how the background video control unit 20 operates referring to FIGS. 2, 5A, 5B, 6A and 6B.

Figure 5A:
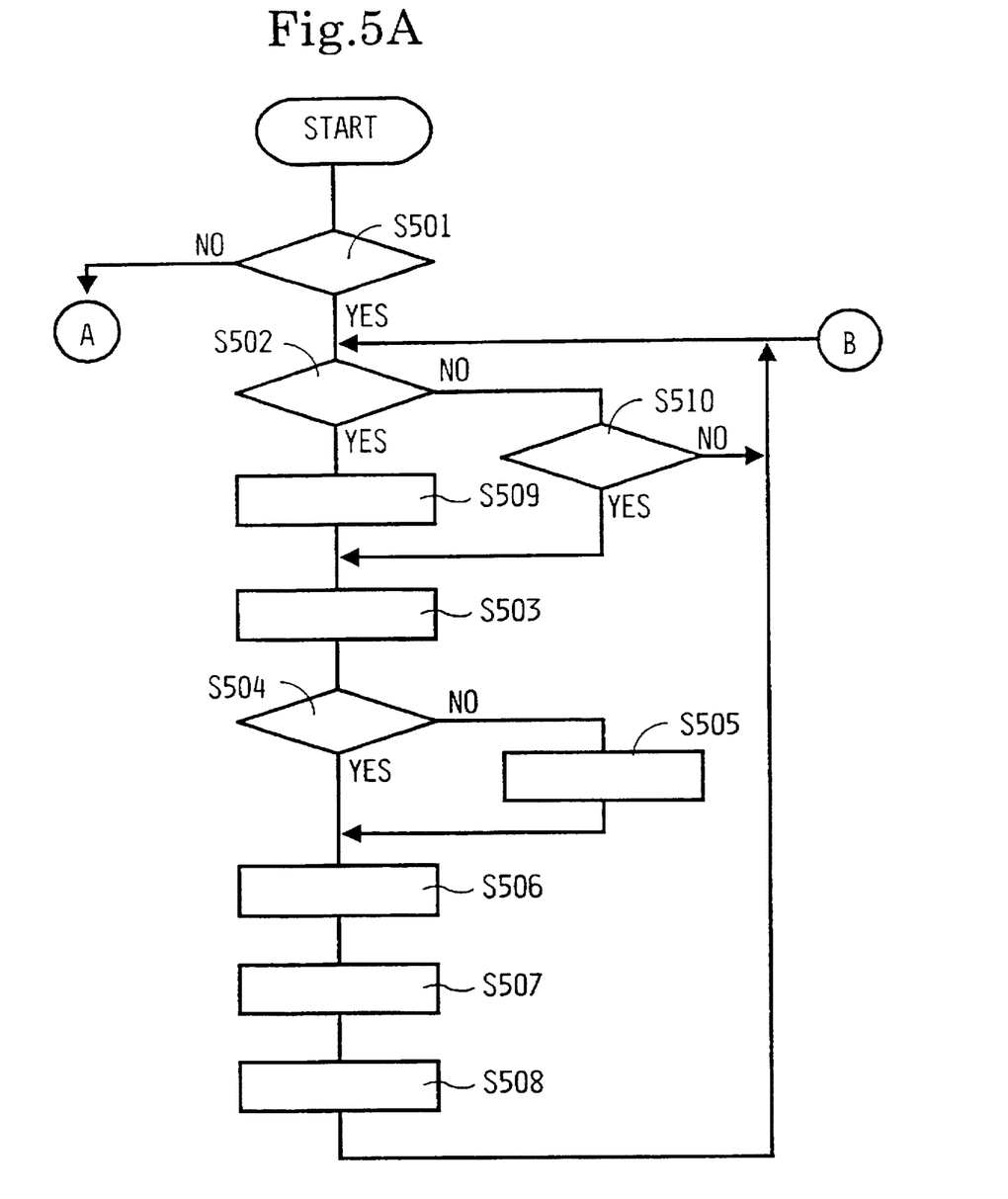
FIG. 5A is a flowchart of steps in which a background video control unit of the system operates.
Figure 5B:
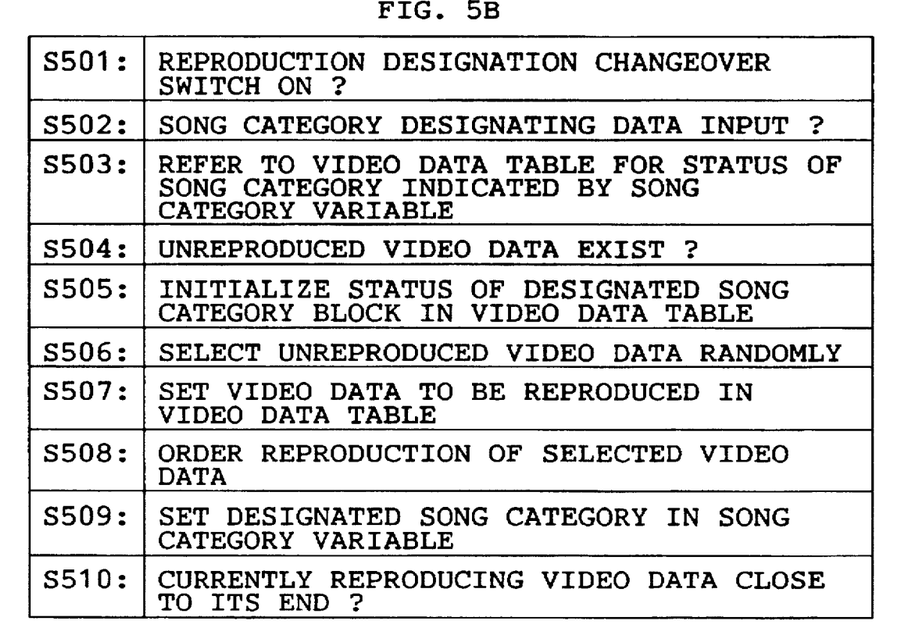
FIG. 5B is a table listing the steps of the flowchart of FIG. 5A.

When the background video reproducing apparatus 5 is turned on, the CPU 20A checks the reproduction designation changeover switch 26 (step S501) for its status. If the switch 26 is found to be on, the process of randomly reproducing video data is selected; if the switch 26 is found to be off, the process of sequentially reproducing video data of a given song category block is selected.

More specifically, when the reproduction designation changeover switch 26 is turned on, the CPU 20A checks to see if the song category designating data 4 is input from the karaoke control unit 1 to the song category designation input unit 21 (step S502). If the song category designating data 4 has yet to be input to the song category designation input unit 21, a check is made to see if the currently reproducing video data is nearing its end (step S510). The determination of the check at step S510 is executed by reading flag data previously written near the end of the video data or by comparing a total reproducing time of the video data with an elapsed time of the same. If the currently reproducing video data is not close to its end, step S502 is reached again. If the currently reproducing video data is nearing its end, step S503 is reached. The video reproducing status held in the video data table 23 is examined by use of the song category variable stored in the song category variable memory 29 at step S503. The song category variable stored in the song category variable memory 29 remains the same as that of the song being currently reproduced. Therefore, the processing for designating a reproduction of the next video data to be reproduced for the currently reproducing song starts if it is determined that the currently reproducing video data is nearing its end at step S510.

If the song category designating data 4 is found to be input in step S502, the designated song category is set in a song category variable memory 29 as the song category variable and the song category designation input unit 21 (step S509) is cleared. Step S509 is followed by step S503 in which the video reproducing status held in the video data table 23 is examined by use of the song category variable stored in the song category variable memory 29. Upon examination, a check is made to see if there still exists unreproduced video data (step S504). If all video data in the designated song category block is found to be reproduced, the reproducing status of that song category block is initialized in the video data table 23 (step S505), and step S506 (described later) is reached. The process of step S504 serves as the determining means for determining whether all relevant video data has been reproduced on the basis of the contents of the video data table 23.

When the CPU 20A finds in step S504 that there exists unreproduced video data, or when the CPU 20A has completed the process of step S505, the CPU 20A using a random function incorporated therein randomly selects some of the unreproduced video data of the currently selected song category (step S506). The video data to be reproduced is set where appropriate in the video data table 23 (step S507). Thereafter, the CPU 20A sends a reproduction command to the video data memory 25 ordering it to reproduce the randomly selected video data (step S508). When the video reproducing unit 22 outputs the video signal to the karaoke control unit 1 for reproduction, step S502 is reached. The process of step S506 serves as the selecting means for selecting the unreproduced video data. The process of step S508 serves as the reproduction designating means for designating the video data selected in step S506 to be reproduced.

The video data of the song category designated by the karaoke control unit 1 is reproduced continuously in the manner described until another song category is designated. If the karaoke control unit 1 outputs an end-of-accompaniment signal, the reproduction process may be interrupted and a standby state may be entered.

Figure 6A:
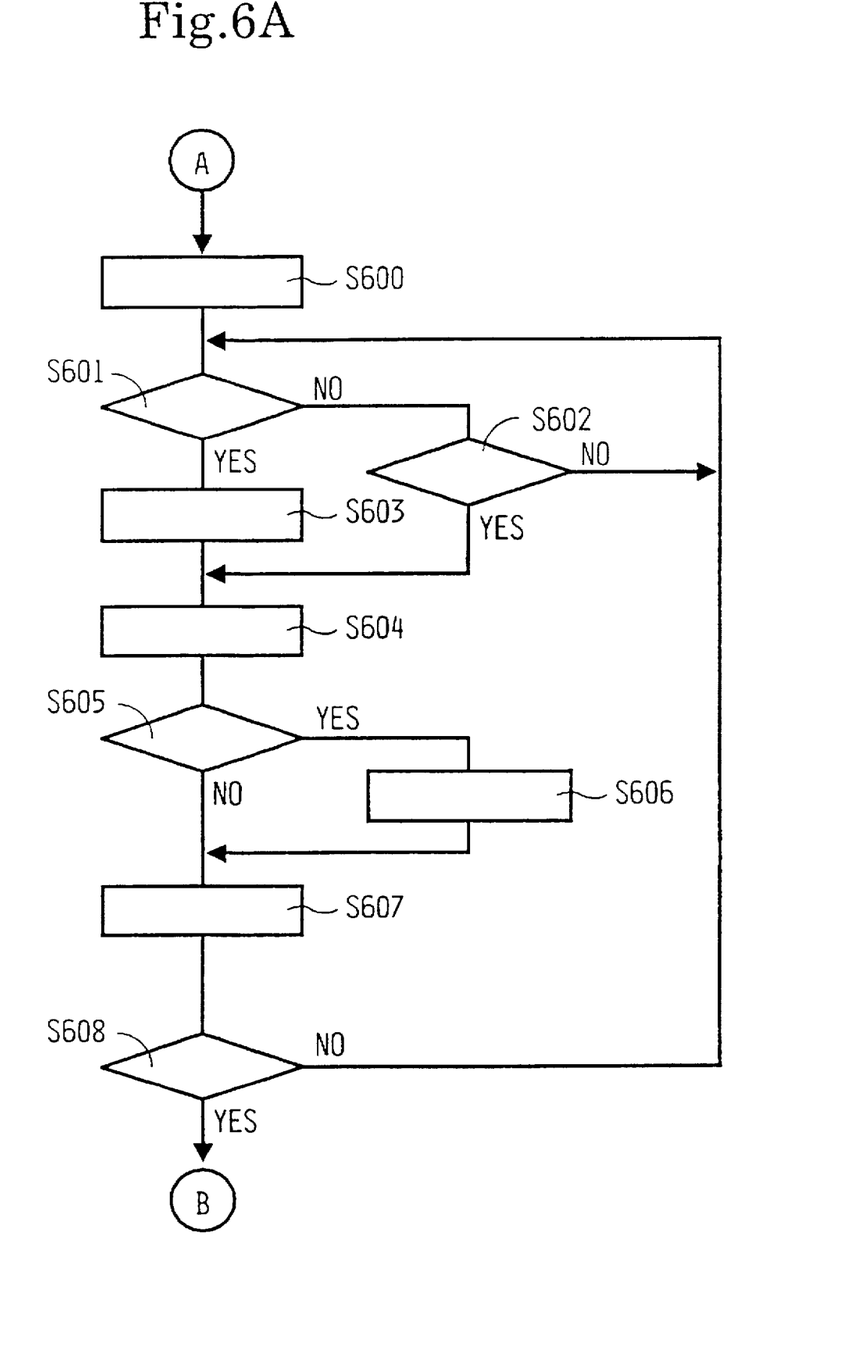
FIG. 6A is another flowchart of steps in which the background video control unit operates.
Figure 6B:
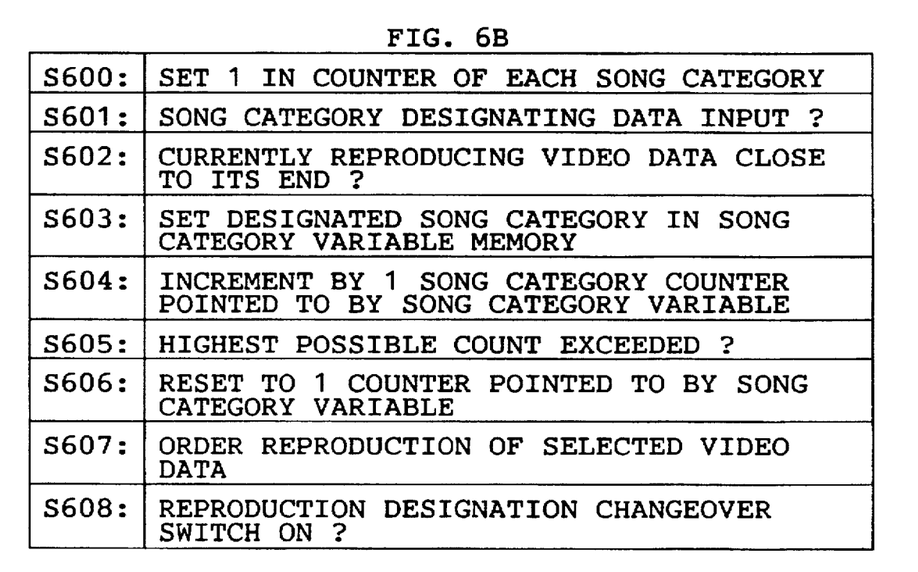
FIG. 6B is a table listing the steps of the flowchart of FIG. 6A.

If the reproduction designation changeover switch 26 is found to be off, the CPU 20A carries out the following steps shown in FIG. 6A and listed in FIG. 6B. The CPU 20A first initializes the counter of each song category to 1 (step S600). The CPU 20A then checks to see if the song category designating data 4 is input from the karaoke control unit 1 to the song category designation input unit 21 (step S601). If the song category designating data 4 has yet to be input, a check is made to see if the currently reproducing video data is nearing its end (step S602). If the currently reproducing video data is not close to its end, step S601 is reached again. If the currently reproducing video data is found to be close to its end, step S604 (described later) is reached.

If the song category designating data 4 is found to be input in step S601, the designated song category is set in the song category variable memory 29, and the song category designation input unit 21 is cleared like the process of step S509 (step S603). After step S603, or after step S602 wherein the end of the currently reproducing video data is found to be near, the song category counter pointed to by the song category variable is incremented by 1 (step S604). A check is then made (step S605) to see if the counter has exceeded its highest possible count (m for pops block 40, n for enka block 41, j for animation song block 42, k for martial song block 43). If the highest possible count of the counter is found to be exceeded, the counter is reset to 1 (step S606). If the counter value has yet to exceed the highest possible count for the currently selected song category, or if the process of step S606 is terminated, the video data memory 25 is ordered to reproduce the video data pointed to by the counter (step S607). In that case, the video signal is output via the video reproducing unit 22 to the karaoke control unit 1. Then, the CPU 20A checks the reproduction designation changeover switch 26 for its status (step S608). If the switch 26 is found to be on, the process of reproducing video data is changed to the randomly reproducing process and step S608 is followed by step S502. If the switch 26 is found to be off, the process returns to step S601. If, as in the foregoing processing, the karaoke control unit 1 outputs an end-of-accompaniment signal, the reproducing process may be interrupted, and a standby state may be entered.

As described, the background video reproducing apparatus of the invention retains information about the video data already reproduced so as not to reproduce the same images repeatedly. This allows customers of the do-it-yourself vocals to enjoy background video accompaniment without feeling bored watching the repeated video reproduction.

Although the description above contains many specificities, these should not be construed as limiting the scope of the invention but as merely providing illustrations of the presently preferred embodiment of this invention. For example, whereas the storage means of the above embodiment is arranged to store the current status of video data reproduction, an additional memory unit may be provided as a second storage means for storing the sequence in which the video data has been reproduced. The second storage means allows the video data to be again reproduced later in the order in which it was reproduced. With the same video data reproduced at regular intervals, customers are less likely to see the same images repeatedly and are therefore less likely to be bored thereby.

Whereas the storage means of the above embodiment stores information about the selected video data as already reproduced data even before actual reproduction, the storage means may alternatively be arranged to store information about the selected video data as reproduced data only after it is actually reproduced. If the currently selected video data is interrupted during reproduction for some external reason, the control unit when resuming reproduction considers the interrupted video data to be unreproduced and proceeds to select the same data. This makes it possible to better average the reproduction frequencies of the stored video data.

The storage means may alternatively comprise two areas: one area for storing information about the selected video data as currently reproducing data even before actual reproduction, and the other area for storing information about the video data as reproduced data after actual reproduction. The arrangement distinguishes two states: one in which the selected video data is currently reproducing, and the other in which the selected video data has all been reproduced. If the selected video data is interrupted during reproduction for some external reason, the control unit when resuming reproduction selects and reproduces the video data whose status as currently reproducing data was retained by the storage means. This allows customers to enjoy background video accompaniment without feeling awkward as a result of watching different images while singing the previously selected same song.

Whereas the selecting means of the above embodiment is designed to select randomly or in a predetermined sequence the video data of a given song category block stored in the video data memory 25, there may be cases where there are a plurality of video blocks of the same song category. In such cases, the multiple video blocks may be subsumed under a single greater video block from which the blocks may be selected randomly or in a predetermined sequence of these video blocks. When all video data of a given video block has been reproduced, the video data of another block in the same song category may be selected randomly or in a predetermined sequence of that video block.

Whereas the retaining means of the above embodiment is the memory backed up by the backup power supply unit 24 for keeping the stored data retained when power is removed, the backup power supply unit 24 may alternatively be replaced by an EEPROM, a flash EPROM, a magnetic storage unit or some other memory capable of retaining the stored data while power is off. The alternative arrangement makes the circuit constitution simpler than that proposed illustratively above.

As another alternative, the backup power supply unit 24 may be a capacitor arrangement for retaining the stored data in the memory. This arrangement is inexpensive to implement.

Whereas the video data memory 25 of the background video reproducing apparatus 5 is generally an analog type video disc or the like, recent advances in digital animation data compression technology makes it possible to utilize a mass digital data storage medium such as a CD-ROM, a hard disc or a digital audio tape (DAT). Where the storage medium is of an interchangeable type such as the CD-ROM, a plurality of media of this type may be incorporated in the storage unit and changed one after another by an auto changer or the like. The arrangement helps constitute a system that reproduces greater quantities of background video data for longer periods of time than ever before.

One of the benefits of the invention is that the selecting means for selecting the video data permits random video selection. That is, customers cannot predict the background images they will get when singing songs. This prevents the customers from getting bored with the predictable video data reproduction.

The selecting means for selecting the video data may be set to reproduce video data of a given song category block in a desired sequence. This allows the video data to be tested easily for reproduction.

The selecting means may be set selectively either for random video data selection or for specific video data sequence selection of the image data in a given song category block. In this manner, the advantages derived from either option are obtained inexpensively.

With the separate memory provided to store the sequence in which the video data has been reproduced, the video data may again be produced using the memory in the same sequence in which the data was reproduced. This allows the same video data to be reproduced at regular intervals, so that customers are less likely to watch the same images repeatedly and are therefore less likely to be bored thereby.

Because the information about the video data having been reproduced is retained after power is removed, it is possible to exclude the possibility of reproducing the same images until after all stored images have been reproduced and the reproduction-related information is cleared. This averages the reproduction frequencies of the video data and eliminates the cases where specific images are reproduced repeatedly or where certain images are reproduced rarely if ever.

What is claimed is:

1. A video reproducing apparatus for controlling reproduction of video data comprising:
    a video data storage means for storing video data in groups;
    a historical storage means for storing at least one of two sets of historical data, one set of historical data corresponding to video data that have been reproduced and the other set of historical data corresponding to video data that is currently being reproduced;
    a determining means coupled to the video data storage means and the historical storage means for determining whether any video data in a group of the video data stored in the video data storage means has not yet been reproduced based on a comparison between the video data stored in the video storage means and the historical data stored in the historical storage means;
    a selecting means coupled to the determining means for selecting video data from any of the remaining video data yet to be reproduced in the group of the video data stored in the video data storage means when the determining means determines that any video data remains yet to be reproduced; and
    a reproduction designating means coupled to the selecting means for designating the reproduction of the video data selected by the selecting means,
    wherein the comparison between the video data in the video data storage means and the historical data in the historical storage means prevents video data that has already been produced during a session from being produced again unless all video data in the corresponding group has been reproduced,
    wherein the video data is adapted to be reproduced simultaneously with audio data, the reproduction of the video data being independent of the order in which the audio data is reproduced.

2. A video reproducing apparatus as claimed in claim 1, further comprising an input means coupled to the determining means for inputting selection information for selecting a group of video data, wherein the determining means determines whether any video data in the group selected by the selection information remains yet to be reproduced.

3. A video reproducing apparatus as claimed in claim 1, wherein the selecting means includes switching means for switching between one of two states, one state for randomly selecting the video data and the other state for selecting the video data in a predetermined sequence.

4. A video reproducing apparatus as claimed in claim 3, further comprising an input means coupled to the determining means for inputting selection information for selecting a group of video data, wherein
    the determining means determines whether any video data in the group selected by the selection information remains yet to be reproduced and
    the selecting means selects the video data from the group selected by the selection information of video data.

5. A video reproducing apparatus as claimed in claim 1, further comprising a clearing means coupled to the historical storage means for clearing the historical storage means when the determining means determines that no video data remains yet to be reproduced.

6. A video reproducing apparatus as claimed in claim 5, further comprising an input means coupled to the determining means for inputting selection information for selecting a group of video data, wherein
    the determining means determines whether any video data in the group selected by the selection information of video data remains yet to be reproduced, and the clearing means clears the historical data corresponding to the video data in the group selected by the selection information.

7. A video reproducing apparatus as claimed in claim 6, wherein the historical storage means includes data retaining means for retaining the historical data held in the historical storage means whenever the video reproducing controlling apparatus is turned off.

8. A video reproducing apparatus as claimed in claim 7, further comprising a reproducing means for reproducing a video by reading out from the video data storage means the video data designated by the reproduction designating means.

9. A video reproducing apparatus as claimed in claim 8, wherein the input means inputs selection information for selecting a group of video data according to a category of a song indicating data entered into the input means.

10. A video reproducing apparatus as claimed in claim 9, further comprising an audio reproducing means for reproducing an audible signal according to the song indicating data.

11. A video reproducing apparatus as claimed in claim 1, wherein the selecting means is automatic and automatically selects the video data in a predetermined sequence when the determining means determines that no video data remains yet to be reproduced.

12. A video reproducing apparatus as claimed in claim 11, further comprising an input means coupled to the determining means for inputting selection information for selecting a group of video data, wherein the determining means determines whether any video data in the group selected by the selection information remains yet to be reproduced and the automatic selecting means automatically enters the state for selecting the video data from the group selected by the selection information in the predetermined sequence when the determining means determines that no video data remains yet to be reproduced.

13. A reproducing apparatus that reproduces an output signal, comprising:

an input that receives output selection data;

a storage memory that stores a plurality of output data;

an output data table that stores output signal reproduction data;

a reproducing unit that reproduces the output signal by converting stored output data into the output signal;

a controller coupled to said input, said storage memory, said output data table and said reproducing unit that selects stored output data from said storage memory based on said output selection data from said input and said output signal reproduction data stored in said output data table so that the selected output data is not repeated during a session unless all other output data has been reproduced, and instructs said reproducing unit to reproduce the output signal; and a reproduction designation changeover switch coupled to said controller that selects a mode of retrieving output data from said storage memory, wherein the output signal is adapted to be reproduced simultaneously with a second output signal, the reproduction of the output signal being independent of the order in which the second output signal is reproduced.

14. The reproduction apparatus of claim 13, wherein said output signal is a video signal.

15. The reproduction apparatus of claim 13, wherein said output data table comprises a writable memory that stores current and past reproduction output signal data.

16. The reproduction apparatus of claim 13, wherein said storage memory includes output data stored in groups based on categories of output signals.

17. The reproduction apparatus of claim 13, wherein said reproduction designation changeover switch selects a mode of random or sequential retrieval.

18. The reproduction apparatus of claim 13, further comprising a back-up power supply unit coupled to said output data table that supplies power to maintain the data stored in said output data table when power is removed from the reproduction apparatus.

19. The reproduction apparatus of claim 13, further comprising a category variable memory coupled to said controller and said input that stores category variables corresponding to input selection data that said controller uses to select stored output data from said storage memory.

20. A method of reproducing output signals comprising the steps of:

storing output data in groups;

storing historical output data regarding output signals that have been reproduced and are currently being reproduced;

inputting selection data corresponding to a group of data;

determining output data based on the stored historical data and the input selection data to determine which data in the selected group of data have not been reproduced;

selecting output data from only any of the determined output data determined to have not yet been reproduced; and reproducing the selected output data, wherein the selected output data is simultaneously reproduced with a selected one of a plurality of stored second output data, the second output data being reproduced independently of the order in which the second output data is reproduced.

21. The method of claim 20, wherein the step of reproducing the selected output data comprises reproducing video data.

22. The method of claim 20, wherein the step of selecting output data includes randomly selecting output data that has not yet been reproduced from a group of stored data.

23. The method of claim 20, wherein the step of selecting output data includes sequentially selecting output data from a group that has not yet been reproduced.

* * * * *